Oct. 25, 1938.
R. M. HEINTZ
2,134,250
VALVE SEAT AND GUIDE
Filed Feb. 24, 1936
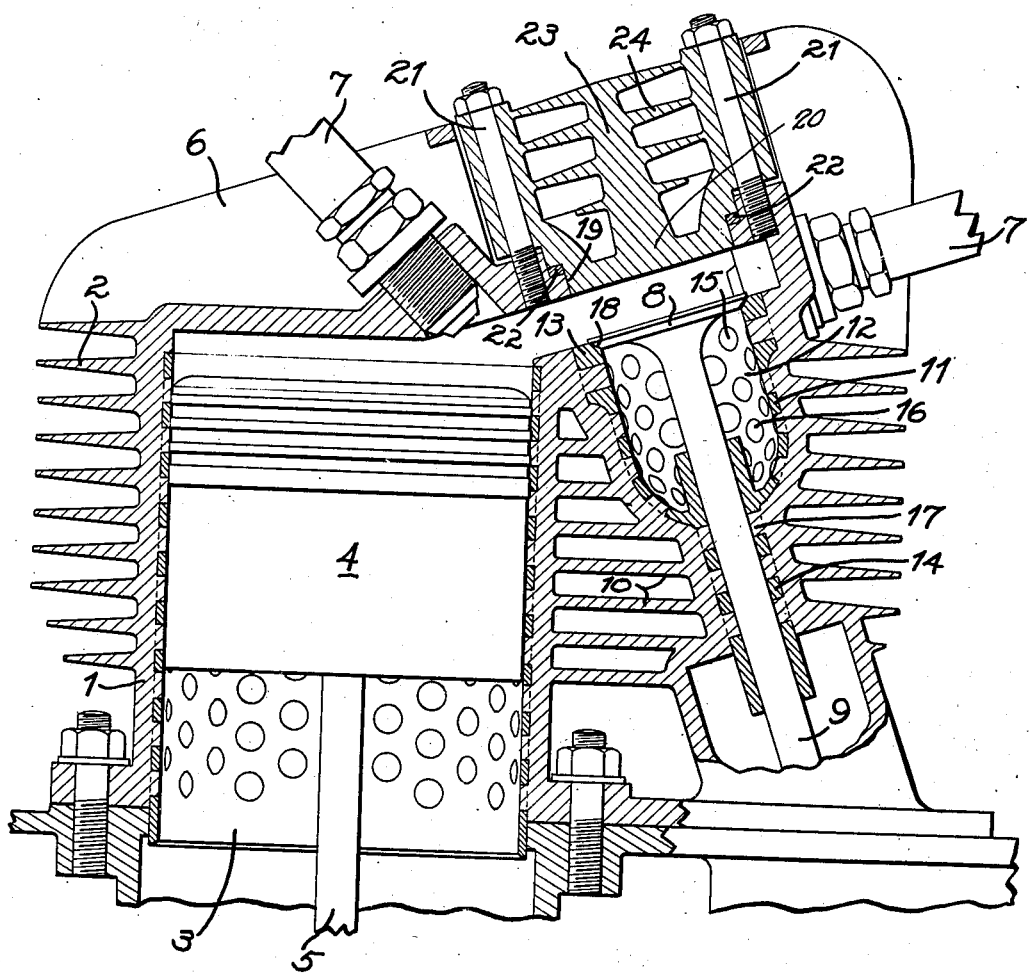
INVENTOR.
RALPH M. HEINTZ.
BY
Lippincott & Metcalf
ATTORNEYS.

Patented Oct. 25, 1938

2,134,250

UNITED STATES PATENT OFFICE 2,134,250

VALVE SEAT AND GUIDE

Ralph M. Heintz, Palo Alto, Calif., assignor, by mesne assignments, to Bendix Aviation Corporation, South Bend, Ind., a corporation of Delaware Application February 24, 1936, Serial No. 65,472

1 Claim. (Cl. 123—188)

My invention relates to a valve seat and stem guide, and more particularly to a unitary structure for mounting a valve in an internal combustion engine or the like.

Among the objects of my invention are: To provide a hardened valve seat and means for locking the seat in position in an engine cylinder; to provide a unitary seat and stem guide; to provide a means and method of cooling inserted valve seats in internal combustion engines; to provide a means and method of reducing the size of valve caps in internal combustion engines; and to provide a unitary seat and guide which may be precast in place in an engine cylinder.

My invention possesses numerous other objects and features of advantage, some of which, together with the foregoing, will be set forth in the following description of specific apparatus embodying and utilizing our novel method. It is therefore to be understood that my method is applicable to other apparatus, and that I do not limit myself, in any way, to the apparatus of the present application, as I may adopt various other apparatus embodiments, utilizing the method, within the scope of the appended claim.

The drawing accompanying this specification is a sectional view of an engine cylinder embodying my invention.

In modern high speed engines it has become good practice to utilize a hardened valve seat insert which may be ground to fit the poppet valves ordinarily used. The customary manner of inserting such valve seats is to machine the edge of the valve stem chamber to receive a seat ring which is ground a few thousandths oversize. The seat ring is then shrunk by treatment in liquid air until it may be placed within the prepared cut, and then allowed to warm up, the seat being maintained in place by the expansion of the seat ring at operational temperatures. Such a procedure, however, necessitates the making of the opening above the valve of sufficient diameter to allow entrance of the seat insert, and this in turn necessitates the use of a large valve cap. In addition, seat cooling is none too good.

My invention broadly comprises the use of a seat which is cast in place at the time the cylinder is poured so that the valve opening need only be as large as the valve.

My invention further broadly comprises the use of means for securely locking the insert in place, and still further comprises the use of a unitary insert where the seat is made as a unitary structure which also includes the stem guide.

I prefer to bond my insert to the surrounding cylinder material by the use of apertures whereby the cylinder material at the time of casting may enter the apertures to form an interlock, and a large surface contact between the two materials, to promote seat cooling.

Other broad aspects of my invention may be more fully understood by direct reference to the drawing, which illustrates, in this particular instance, a preferred embodiment of my invention as applied to a cylinder 1 provided with cooling fins 2 in order that it may be cooled by air draft. The cylinder itself is provided wtih a liner 3 cast therein according to the method of my patent for a "Method of making engine cylinders", No. 1,955,292, issued April 17, 1934, the cylinder being afterwards machined and having inserted therein a piston 4, mounted on a connecting rod 5 attached to the usual crank shaft, not shown.

The cylinder head proper is provided with vertical cooling fins 6, a pair of spark plugs 7—7, and a valve assembly which comprises a valve head 8 attached to the usual stem 9, mounted preferably at an angle with the cylinder to allow the cylinder material to be extended therearound, and apertured between the valve and the cylinder to provide air spaces 10. Thus, both sides of the valve stem may be efficiently cooled. The valve may be raised by any convenient form of lifter structure.

Cast into the valve assembly is a preformed insert of hardened material comprising a cup-shaped body portion 11 enclosing a valve stem chamber 12, and terminating in an enlarged seat portion 13. The lower end of the cup is provided with a stem extension 14 which is bored out to receive the stem 9. As this insert is to be placed in the mold at the time the cylinder material is poured, I prefer to provide the seat ring 13 with peripheral apertures 15, the cup portion with wall apertures 16, and the guide portion 14 with additional apertures 17 so that cylinder material may enter the apertures and substantially fill them, thus greatly enlarging the contact surfaces.

It is of course natural that during the casting process some material will enter the interior of the insert, and in this respect I prefer to machine the inner surface of the stem guide 14 so that both the insert and the portions of the cylinder material extending through the insert are brought into a substantially common surface. The inner wall of the valve stem chamber may be machined also if it is desirable, or this interior may be plugged with sand during the casting process so that the cylinder material does not project therein to any great extent and this wall left without machining. A valve surface 18 is then provided on the seat ring upon which the valve may make contact.

Inasmuch as the entire insert is positioned within the mold and the metal cast in place around it, it is obvious that the aperture 19 over the valve need only be of a diameter sufficient to allow the insertion of the valve itself, and need not be as large as the diameter of the seat ring. I am therefore enabled to utilize a relatively small valve cap 20, and in this case I prefer to hold the valve cap in place by vertical studs 21, making a seal by means of a gasket 22. I also prefer to form the valve cap with a vertical central stem 23, provided with horizontal fins 24, which are at right angles to the vertical fins 6, thus allowing air to pass freely through the cap material, thus cooling the cap. This cap is more fully described and claimed in United States Letters Patent No. 2,104,257, issued January 4, 1938, and filed contemporaneously with the present application.

Inasmuch as the seat ring 13 and guide 14 are both tied together by the cup portion 11, it will be seen that the valve is at all times maintained centrally in its cage. Furthermore, the entrance of cylinder material into the seat ring and into the insert in general creates a rapid withdrawal of heat from the neighborhood of the seat itself, thus allowing the seat to run comparatively cool.

I claim:

In combination with a cast engine cylinder, a preformed unitary insert of material harder than the cylinder material, comprising a valve seat ring, a skirt attached to said ring and defining a valve stem chamber and a valve stem guide attached to said skirt, said seat, skirt and at least part of said guide being surrounded by cylinder material cast thereon, said ring, skirt and the surrounded portion of said guide being perforated and substantially filled with cylinder material, said cylinder material terminating at the inner surface of said insert, thereby providing part of the inner wall of said chamber and part of the bearing surface of said guide.

RALPH M. HEINTZ.